US008520333B2

(12) United States Patent
Li

(10) Patent No.: US 8,520,333 B2
(45) Date of Patent: Aug. 27, 2013

(54) MAGNETIC STRUCTURE FOR ERASING DISK OR DISKS WITHIN HARD DISK DRIVES

(75) Inventor: Chun Li, Plainview, NY (US)

(73) Assignee: Dexter Magnetic Technologies, Inc., Elk Grove Village, IL (US)

( * ) Notice: Subject to any disclaimer, the term of this patent is extended or adjusted under 35 U.S.C. 154(b) by 290 days.

(21) Appl. No.: 13/084,012

(22) Filed: Apr. 11, 2011

(65) Prior Publication Data

US 2011/0261481 A1 Oct. 27, 2011

Related U.S. Application Data

(60) Provisional application No. 61/327,270, filed on Apr. 23, 2010.

(51) Int. Cl.
*G11B 5/03* (2006.01)
*H01F 13/00* (2006.01)

(52) U.S. Cl.
USPC ............................................ 360/66; 361/149

(58) Field of Classification Search
None
See application file for complete search history.

(56) References Cited

U.S. PATENT DOCUMENTS

| | | | | |
|---|---|---|---|---|
| 7,652,837 | B2 * | 1/2010 | Kitamura et al. | 360/66 |
| 2001/0043420 | A1 * | 11/2001 | Serizawa | 360/57 |
| 2010/0176903 | A1 * | 7/2010 | Li et al. | 335/306 |

* cited by examiner

*Primary Examiner* — Regina N. Holder
(74) *Attorney, Agent, or Firm* — Richard A. Fagin

(57) ABSTRACT

A structure for erasure of magnetic media in a hard drive includes a main field pole magnet polarized in a direction toward a drive spindle motor in the hard drive. At least two quadrature magnets are disposed adjacent the main field pole magnet and polarized in a direction toward the main field pole magnet. The main field pole magnet and the at least two quadrature magnets are shaped to provide a slot for insertion of the magnetic media. At least two inverse polarity magnets are disposed on portions of the main pole and quadrature magnets forming the slot. The inverse polarity magnets are polarized in a direction opposed to the direction of the main field pole magnet.

6 Claims, 5 Drawing Sheets

100

204

200

MAGNETIC STRUCTURE FOR ERASING DISK OR DISKS WITHIN HARD DISK DRIVES

CROSS-REFERENCE TO RELATED APPLICATIONS

Priority is claimed from U.S. Provisional Application No. 61/327,270 filed on Apr. 23, 2010.

STATEMENT REGARDING FEDERALLY SPONSORED RESEARCH OR DEVELOPMENT

Not applicable.

BACKGROUND

The invention relates generally to the field of devices for erasing data on hard drive disk media. More particularly, the invention relates to structures for such devices that have magnetic fields structured to optimize the erasing capability of the device while minimizing possibility of damage to the disk drive and spindle motors.

To reuse defective hard drives in the process of manufacturing magnetic hard drives, a disk erase process is often used. A conventional disk erase process is DC erase with a servo track writer. While the foregoing procedure can achieve complete erase, it is time consuming and not suitable for mass production. Another method known in the art is to use an external magnetic field source such as a permanent magnet dipole and apply the magnetic field directly onto the hard drive. This method can be very fast as it can be done with hard drive intact. There are a few difficulties with this method that must be addressed. The first difficulty is the required magnetic field magnitude. With the advance of magnetic recording media technology, the coercivity of the magnetic media in a disk drive is much more than in earlier media. High coercivity media requires ever higher magnetic field amplitude for erasing. The second difficulty is the eddy current generated in the disks themselves, which have an aluminum substrate. The higher the magnetic field amplitude, the stronger the eddy current. It is necessary that the disks will be able to overcome the eddy current and achieve at least one rotation under the externally applied magnetic field. The third difficulty is that with ever higher magnetic erasing field amplitudes, the spindle motor will be exposed to the higher amplitude magnetic field. It must be ensured that the spindle motor will function properly after the erase procedure is completed.

SUMMARY OF THE INVENTION

One aspect of the invention is a structure for erasure of magnetic media in a hard drive that includes a main field pole magnet polarized in a direction toward a drive spindle motor in the hard drive. At least two quadrature magnets are disposed adjacent the main field pole magnet and polarized in a direction toward the main field pole magnet. The main field pole magnet and the at least two quadrature magnets are shaped to provide a slot for insertion of the magnetic media. At least two inverse polarity magnets are disposed on portions of the main pole and quadrature magnets forming the slot. The inverse polarity magnets are polarized in a direction opposed to the direction of the main field pole magnet.

Other aspects and advantages of the invention will be apparent from the description and claims which follow.

DETAILED DESCRIPTION

In the present invention, the difficulties associated with hard drive erasing devices known in the art are addressed through a special magnetic dipole structure. The magnetic dipole structure uses vector superposition to achieve a strong magnetic field for the erasure of high coercivity magnetic recording media. In the disclosed dipole magnetic structure, the region of the erasing field is highly concentrated in the disk plane. This reduces the eddy current in the disk substrate substantially and ensures spin of the disks. A front pole piece is used in the structure. The front pole piece acts as magnetic boundary to increase the erasing field due to the magnetic image effect and to shield the spindle motor. The magnetic field amplitude drops rapidly along this barrier so that the erasing field will erase most of the disks without damaging the spindle motor.

Figure 1:
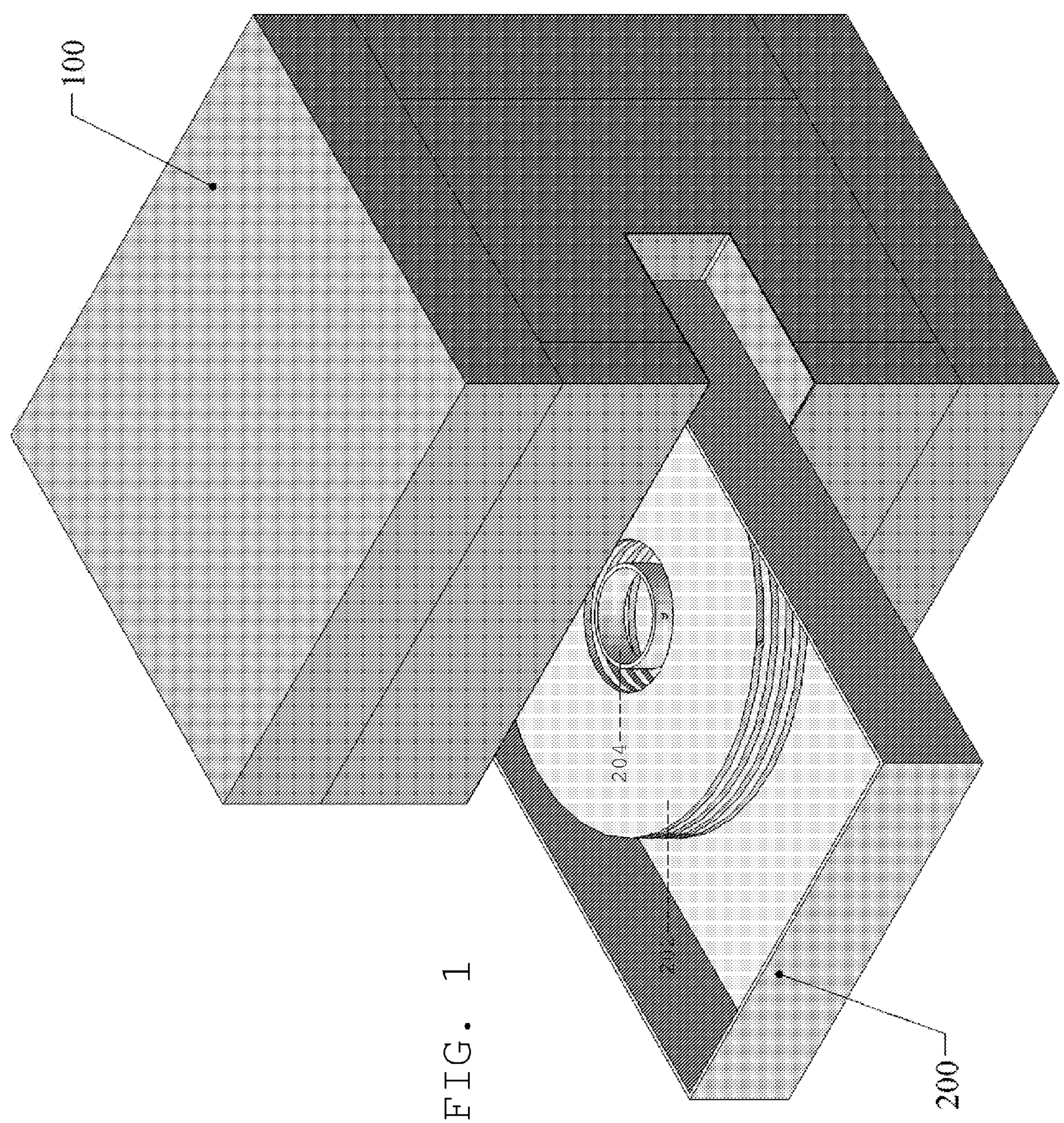
FIG. 1 shows a hard drive inserted into an example hard drive erasing device according to the invention.

FIG. 1 shows a hard disk drive 200 inserted into an example erasing device 100 according to the invention. The disk media 202 and spindle motor 204 can be observed to show their relative positioning in the erasing device 100.

Figure 2B:
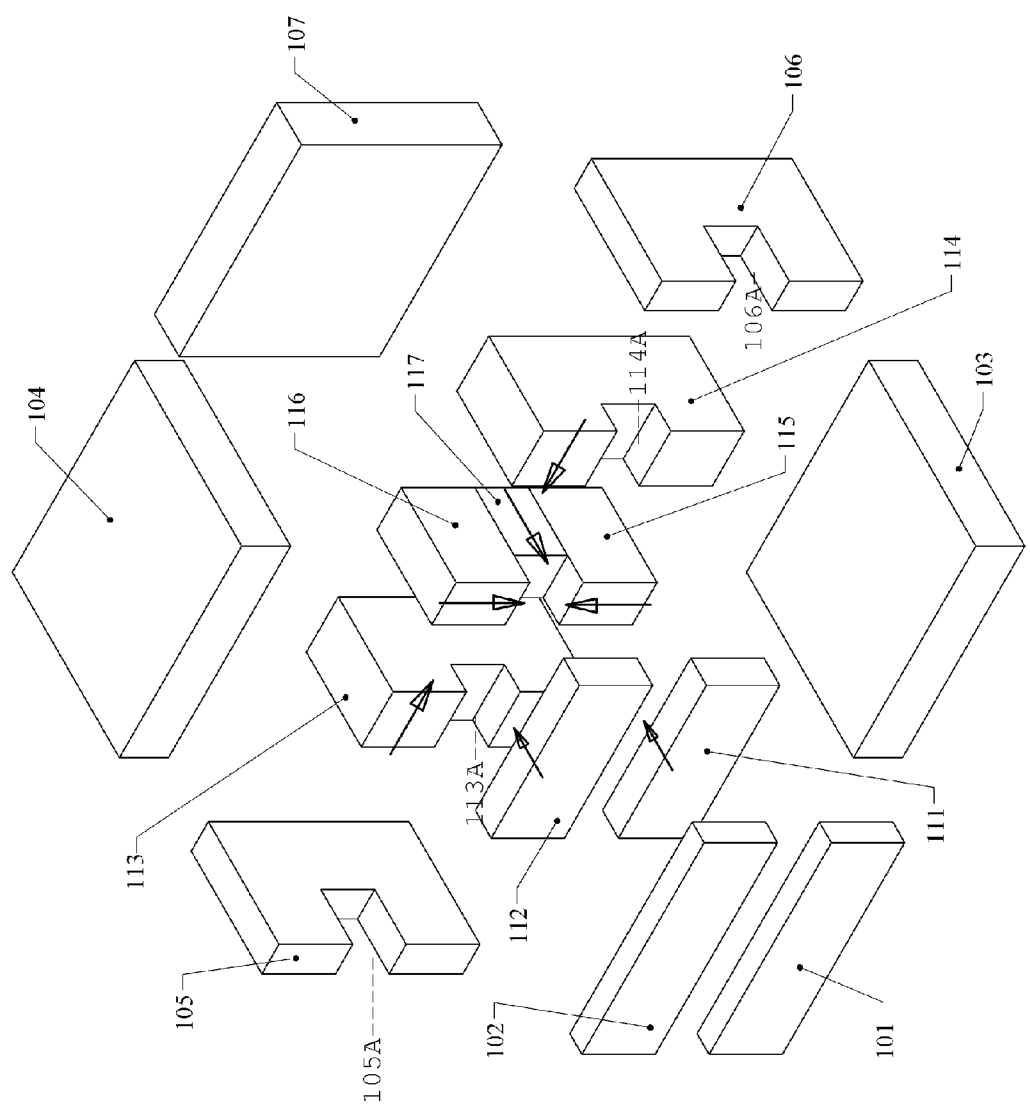
FIG. 2B shows an exploded view of the example erasing device shown in FIG. 2A.
Figure 2A:
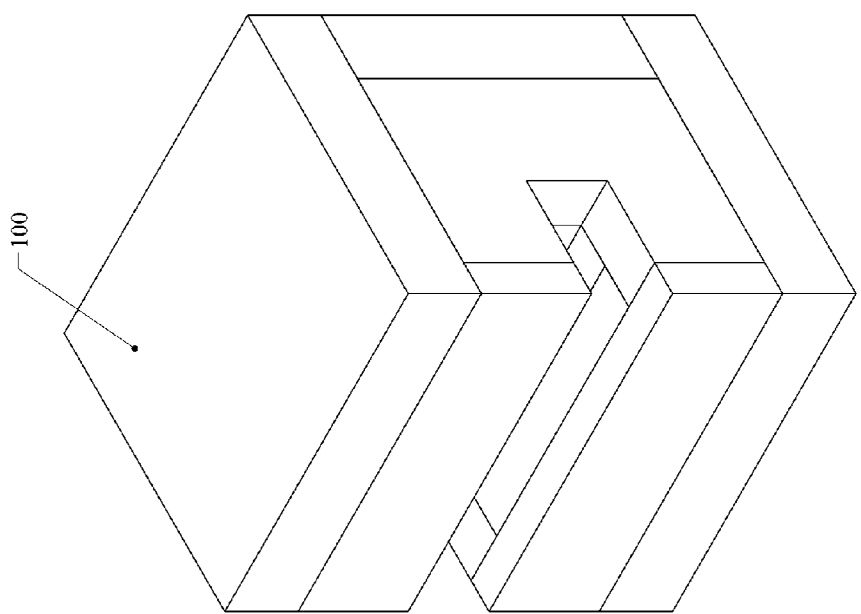
FIG. 2A shows an assembled view of one example of a hard drive erasing device.

FIG. 2A shows the example device 100 of FIG. 1 in assembled form. FIG. 2B shows the example device 100 in exploded view to enable better understanding of the components therein. Items labeled from number 101 to 107 are components for the housing of the magnetic structure, and include forward end plates 101 and 102, top and bottom plates 103 and 104, respectively, slotted side plates 105 and 105 each including a corresponding slot 105A and 106A to enable insertion of the hard disk drive (200 in FIG. 1) into the device 200, and a rear cover plate 107. The foregoing components can be made from either soft magnetic steel or from non magnetic materials, e.g., aluminum or plastic. Soft magnetic steel is preferred for the forward end plates 101 and 102, however.

Items show a 111 to 117 are permanent magnets such as may be made from, for example and without limitation, samarium cobalt or neodymium iron boron. Polarization direction of each magnet is shown by a respective arrow. Side magnets 113, 114 have a channel or slot in the middle thereof, shown at 113A, and 114, respectively. Side magnets 113, 114 are uniformly polarized in a direction toward a center magnet assembly consisting of top and bottom magnets, 115, 116 and center magnet 117. Center magnet 117 is shorter longitudinally than top and bottom magnets 115, 116 to create a corresponding slot for receiving the disk drive (200 in FIG. 1)

Center magnet 117 is the main pole magnet to anchor the field direction. Magnets 113, 114, 115 and 116 surrounding the pole magnet 117 are called “quadrature magnets.” Their polarization orientations as shown by the respective arrows are orthogonal to that of the main pole magnet 117. The fields from the quadrature magnets are superimposed on the field from the main pole magnet 117. The combined magnetic field is strong and narrowly focused pointing in the direction of the spindle motor (204 in FIG. 1).

Magnets arranged in quadrature (referred to for convenience herein as "quadrature magnets" or a "quadrature magnet assembly") are configured so that the magnetic orientation of each magnet is orthogonal to that of adjacent magnets. Such magnet configuration can provide an important performance improvement for applications using magnet assemblies, depending on the required magnetic flux density. Quadrature magnets result in greater force to weight ratio in Lorenz force applications and even greater improvements in force applications depending on magnetic attraction or repulsion, i.e., where force is proportional to flux density squared. Quadrature magnets also provide improved magnetic field shapes in applications where, as in the present invention, optimal flux density gradients are desired. Quadrature magnet assemblies have been made possible by the development of "square" magnet materials. Square magnet materials have essentially a straight line in the second quadrant of the hysteresis curve, where the intrinsic coercivity value (as measured in Oersteds) exceeds the value of residual induction (as measured in Gauss). Magnets made of ferrite, samarium cobalt, and neodymium iron boron are currently the most widely used magnet materials of this type. Prior to the development of the foregoing "square" magnet materials it was impractical to use a quadrature magnet assembly because each magnet in an assembly not using such materials would demagnetize adjacent magnets to some extent when the magnet's induction exceeded the intrinsic coercivity of the adjacent magnets.

Individual magnet geometry is a major factor in selecting an application in which a quadrature magnet assembly is used because the individual magnet geometry establishes the operating point of the magnet. Individual magnet geometry establishes the self-demagnetizing factor of the magnet. Intrinsic coercivity less the value of the self-demagnetizing field determines the value of the external demagnetizing field the magnet can withstand without permanent loss of field strength. Magnetic circuit geometry determines the effectiveness of a group of magnets and ferrous components arranged to work together.

Magnets 111 and 112 are "reverse" magnets (that is, their polarization is reversed relative to the erasure magnetic field) and are positioned below and above the slot for receiving the disk drive, respectively. Their magnetic polarization orientations are away from the spindle motor (204 in FIG. 1) and opposite to polarization direction of the center magnet 117. The magnetic fields from magnet 111 and 112 add to amplitude of the main erase field.

At the spindle motor (204 in FIG. 1) location, which is generally outside magnets 111 and 112, the magnetic flux from magnets 111 and 112 is opposite to the direction of flux from the main erasure magnetic field; thus the two fields cancel each other and provide a low magnetic field zone outside magnets 111 and 112 for the spindle motor (204 in FIG. 1).

Figure 3:
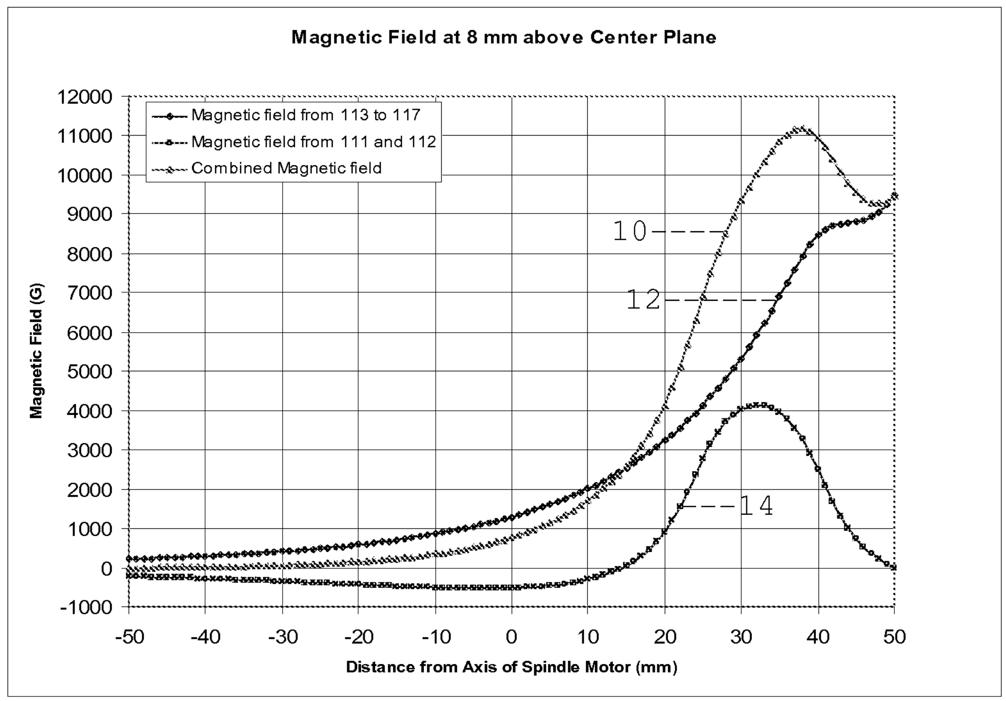
FIG. 3 shows a graph of the magnetic field induced by component magnets and the combination of component magnets for an example device such as shown in FIG. 2B.

FIG. 3 shows a graph of magnetic field amplitude of all of the internal magnets in the device (113 through 117 in FIG. 2B) with respect to position from the spindle motor at 12, the field from the end magnets 111, 112 at 14 and the combined field of all magnets at 10. The relatively small field at the position of the spindle motor (204 in FIG. 1) is evident from the graph in FIG. 3.

Figure 4:
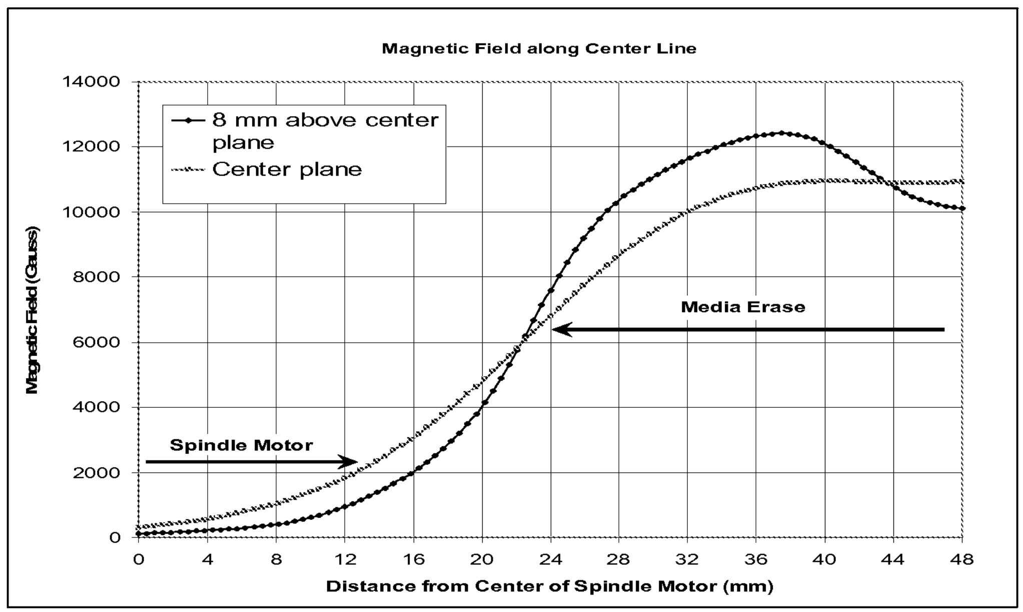
FIG. 4 shows a graph of the magnetic field generated by an example device such as shown in FIG. 2A with reference to the center axis of the spindle motor.

Further improvement, that is higher erase field amplitude and lower field amplitude at the position of the spindle motor (204 in FIG. 1) can be achieved by using soft magnetic steel for the end plates (101 and 102 in FIG. 2B), thus causing them to operate as pole pieces. Pole pieces must be placed on the pole faces of the endmost magnets (111 and 112 in FIG. 2B). Pole pieces enhance the magnetic field further and improve the shielding of the spindle motor (204 in FIG. 1). The arrow heads shown in the exploded view in FIG. 2B of the device can be directed to either the north pole or the south pole of the respective magnet, provided that all the magnets are arranged correspondingly. A plot of the magnetic field distribution using pole pieces as explained above is shown in FIG. 4.

The disclosed structure in FIG. 2B generates a very strong erase field. The required erase magnetic field amplitude can be determined based on the coercivity of the media to be erased. The erase field of the disclosed structure is also highly concentrated. The concentrated field reduces eddy current in the hard drive disk substrates. Another benefit of the disclosed structure is the rapid drop of magnetic field outside the device, toward the spindle motor (204 in FIG. 1). The magnetic field gradient outside the device (200 in FIG. 1) can be as high as 100 T/m. The length of movement of the hard drive (100 in FIG. 2) into the erase slot or gap in the device in the can be controlled to find the optimum stroke length that achieves both maximum erase and maximum protection of spindle motor.

Figures 5A, 5B:
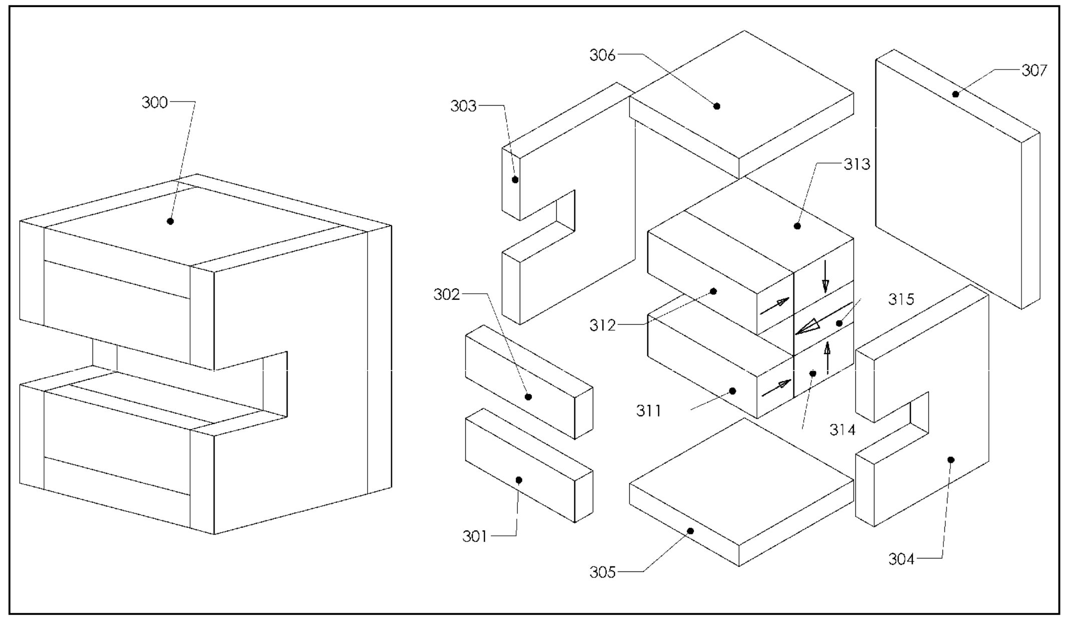
FIGS. 5A and 5B show assembled and exploded views, respectively of another example hard drive erasing device.

FIGS. 5A and 5B show an alternative structure for the erasing device in assembled form, 300 in FIG. 5A, and in exploded view in FIG. 5B. In this example erasing device 300, items 301 to 307 form the housing of the device and correspond in form and function to the housing components explained above with reference to FIG. 2B. The material for items 301 to 307 can be either magnetic or non magnetic. Soft magnetic steel is preferred for items 301 and 302 so that they act as pole pieces, as explained with reference to the previous example in FIG. 2B. 311 to 315 are magnets that form the erase field. Magnet 315 is the main pole magnet for erase field. Quadrature magnets 313 and 314 are oriented orthogonally to the main pole magnet 315. The magnetic flux of the quadrature magnets 313, 314 are superimposed with the field from the main pole magnet 315 and point to the direction of the spindle motor (204 in FIG. 1). End magnets 311 and 312 are oriented opposite to the erase field direction, as in the previous example.

Figures 6A, 6B:
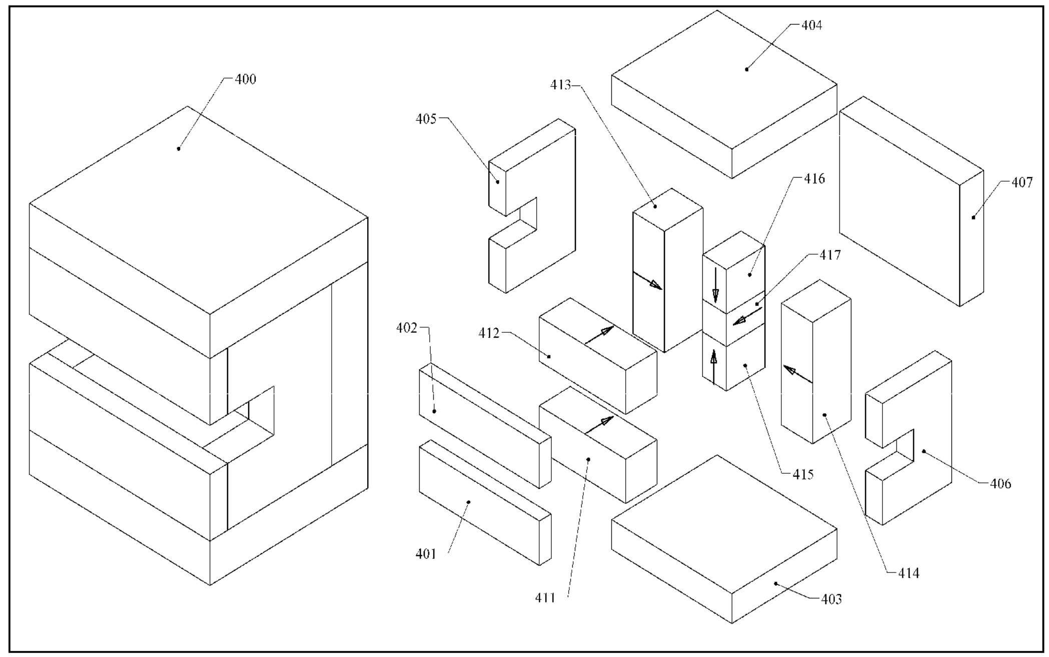
FIGS. 6A and 6B show assembled and exploded views, respectively of another example hard drive erasing device.

FIG. 6A shows an assembled view of another example erasing device 400 based on the example shown in FIGS. 2A and 2B. An exploded view shown in FIG. 6B is one possible variation of the example shown in FIG. 2B. The configuration of orthogonal magnets 413, 414, 415, 416, in FIG. 6B around the main pole magnet 417 vary slightly from the orientations shown in FIG. 2B. The housing components, labeled 401 through 406 correspond in form and function to the housing components shown in FIG. 2B at 201 through 206.

Figures 7A, 7B:
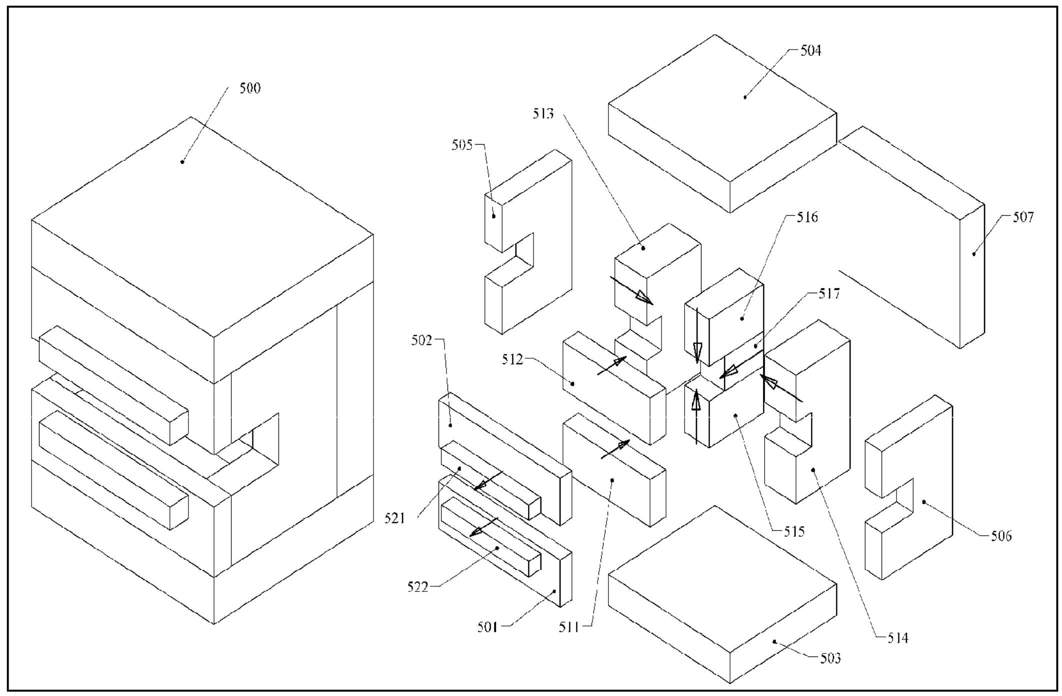
FIGS. 7A and 7B show assembled and exploded views, respectively of another example hard drive erasing device.

FIG. 7A shows an assembled view at 500 and FIG. 7B shows an exploded view of another example of magnetic hard drive disk erasure device.

In the example in FIG. 7B, in addition to the housing components 501 through 506 (corresponding to components 201 through 206 in FIG. 2B) and magnets labeled 511 through 517 (corresponding to magnets 211 through 217 in FIG. 2B) two bucking magnets 521 and 522 are added outside the front pole pieces 501, 502. The magnetic field from these bucking magnets 521, 522 is oriented opposite to the erasing field, thus further reducing the magnetic field at the spindle motor (204 in FIG. 1).

A magnetic disk drive erasing device according to the various aspects of the invention may provide higher erasing field amplitude, with reduced eddy current induction in the disk substrates, while shielding the spindle motor from excessive magnetic field amplitude, thus reducing possible damage thereto.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A structure for erasure of magnetic media in a hard drive, comprising:

a main field pole magnet polarized in a direction toward a drive spindle motor in the hard drive;

at least two quadrature magnets disposed adjacent the main field pole magnet and polarized in a direction toward the main field pole magnet, the main pole magnet and the at least two quadrature magnets shaped to provide a slot for insertion of the magnetic media; and at least two inverse polarity magnets disposed on portions of the main field pole and quadrature magnets forming the slot, the inverse polarity magnets polarized in a direction opposed to the direction of the main field pole magnet.

2. The structure of claim 1 further comprising a pole piece disposed on a surface of each inverse magnet directed toward the hard drive.

3. The structure of claim 2 wherein the pole pieces comprise soft iron.

4. The structure of claim 2 further comprising two bucking magnets polarized in the direction of main field pole magnet and positioned in front of the pole pieces.

5. A structure for erasure of magnetic media in a hard drive, comprising:

a main field pole magnet polarized in a direction toward a drive spindle motor in the hard drive;

at least two quadrature magnets disposed adjacent the main field pole magnet and polarized in a direction toward the main field pole magnet, the main pole magnet and the at least two quadrature magnets shaped to provide a slot for insertion of the magnetic media;

at least two inverse polarity magnets disposed on portions of the main field pole and quadrature magnets forming the slot, the inverse polarity magnets polarized in a direction opposed to the direction of the main field pole magnet;

a pole piece disposed on a surface of each inverse magnet directed toward the hard drive; and two bucking magnets polarized in the direction of main field pole magnet and positioned in front of the pole pieces.

6. The structure of claim 5 wherein the pole pieces comprise soft iron.

* * * * *